United States Patent
Lu

(10) Patent No.: US 8,545,042 B2
(45) Date of Patent: Oct. 1, 2013

(54) SELF-ILLUMINATING BATTERY

(75) Inventor: Yi Lu, Xi'an (CN)

(73) Assignee: Guangzhou Tiger Head Battery Group Co., Ltd., Guangzhou (CN)

( * ) Notice: Subject to any disclaimer, the term of this patent is extended or adjusted under 35 U.S.C. 154(b) by 0 days.

(21) Appl. No.: 12/763,717

(22) Filed: Apr. 20, 2010

(65) Prior Publication Data
US 2010/0284176 A1    Nov. 11, 2010

(30) Foreign Application Priority Data
May 8, 2009    (CN) .......................... 2009 1 0059222

(51) Int. Cl.
*F21L 4/00*    (2006.01)

(52) U.S. Cl.
USPC ......... 362/194; 362/195; 362/249.02; 362/84

(58) Field of Classification Search
USPC ................. 362/194, 195, 84, 249.02, 249.04; 320/112; D13/103; D29/100
See application file for complete search history.

(56) References Cited

U.S. PATENT DOCUMENTS

| | | | | |
|---|---|---|---|---|
| 5,231,297 A * | 7/1993 | Nakayama et al. | ............ | 257/77 |
| 6,017,129 A * | 1/2000 | Krietzman | .................. | 362/184 |
| 6,137,396 A * | 10/2000 | Puppo | .......................... | 340/332 |
| 6,538,375 B1 * | 3/2003 | Duggal et al. | ................ | 313/506 |
| 6,722,771 B1 * | 4/2004 | Stephens | ....................... | 362/184 |
| 6,874,907 B2 * | 4/2005 | Liao | .............................. | 362/183 |
| 6,893,142 B2 * | 5/2005 | Collins | ......................... | 362/195 |
| 7,670,024 B2 * | 3/2010 | Leslie et al. | .................. | 362/197 |
| 7,683,275 B2 * | 3/2010 | Moore et al. | ................ | 200/17 R |
| 8,057,062 B2 * | 11/2011 | Yu et al. | ........................ | 362/183 |
| 2004/0136186 A1 * | 7/2004 | Hsu | ............................... | 362/208 |
| 2005/0073833 A1 * | 4/2005 | VanderSchuit | ............... | 362/101 |
| 2006/0007676 A1 * | 1/2006 | Song | ............................. | 362/195 |
| 2006/0034065 A1 * | 2/2006 | Thurk | ............................ | 362/84 |
| 2010/0277344 A1 * | 11/2010 | Jacobs et al. | .................. | 340/944 |

FOREIGN PATENT DOCUMENTS

| | | |
|---|---|---|
| CN | 1959180 | 5/2007 |
| CN | 201059425 | 5/2008 |

* cited by examiner

*Primary Examiner* — Peggy A. Neils
(74) *Attorney, Agent, or Firm* — Hamre, Schumann, Mueller & Larson, P.C.

(57) ABSTRACT

A self-illuminating battery including one or more film light-emitting diodes positioned adjacent an inner surface of a battery casing. The diodes are connect to positive and negative poles through conductor. The battery may also include one or more miniature light-emitting diode mounted at the end of the battery, connecting the positive pole and negative pole through conductor.

9 Claims, 1 Drawing Sheet

SELF-ILLUMINATING BATTERY

FIELD OF TECHNOLOGY

This invention concerns electronic technology.

TECHNOLOGY BACKGROUND

The batteries which can show their remaining capacity in today's market, such as Duracell®, they have a liquid crystal linking positive and negative poles, which is between the surface of battery and its packaging wrap. The remaining capacity can be shown by liquid crystal; however, liquid crystal does not have an illumination function, so customers cannot watch the remaining capacity in a dark environment. China patent 200720032012 discloses a battery that provides not only a power supply but also illumination. There is a light-emitting diode linking the battery's positive pole and negative pole. And a light-emitting diode is incorporated with the battery. The disadvantage of this patent is that it will cause the battery capacity to decrease if we don't change the battery's size, because incorporating the light-emitting diode and the battery will cause the light-emitting diode to occupy the inner space of the battery. The production craft of the battery is different and cannot contain the same power as before.

China patent 200610114507.5 discloses a self-illuminating battery which can be charged. It is in fact a light and is largely different from a common battery.

SUMMARY OF THE INVENTION

The technology issue should be solved in this invention is to provide a new type of battery, achieving an objective that the battery not only self illuminates but also shows its remaining capacity in dark.

There are two ways to design the self-illuminating battery. The first way is that a thin-film light-emitting diode can be set up on an outer surface of battery, contacting positive and negative poles. Besides, a micro-light-emitting diode also can be set at an end of the battery, linking the positive pole and negative pole through a lead.

The above-mentioned thin-film light-emitting diode is located at a side of the battery, covered by a packaging wrap of the battery. And a portion of the packaging wrap covering the thin-film light-emitting diode is transparent. Or a micro-light-emitting diode can be set at a top or bottom end of the battery.

A driving circuit linking with the light-emitting diode is fixed on the outer surface of the battery. There is a switch being set in the circuit which links with the light-emitting diode and the battery's positive and negative poles. The switch is a membrane contact switch. And this switch is an elastic contact switch, it is normally off. The driving circuit and light-emitting diode are set around the top of the battery, or being set at the bottom of the battery.

The above-mentioned batteries can be D, C, AA, AAA size, it also can be 3V, 6V, 9V batteries.

There are several advantages of this invention. First, because the thin-film light-emitting diode is fixed on the outer surface of the battery, we don't need to modify a lot in the existing battery product line. Therefore, we can achieve a new function in the lowest cost. Second, the battery is equipped with a luminescence light-emitting diode, so it illuminates without the need of a flash fight. It can provide a large convenience when suffering earthquake or other emergency situations. Third, the battery has a long using life due to the high energy conversion efficiency. Besides, setting an elastic membrane switch in the light-emitting diode can control the illuminating time of light-emitting diode. Furthermore, this invention can show the remaining capacity of the battery, which is convenient to make full use of the battery and is good for environmental protection.

This invention makes an improvement of batteries, and the new adding function will not affect the power supply functions which battery using in other electric apparatus. This is an important difference between the new invention and existing light-emitting diode technology.

A further illustration is explained with attached drawing and idiographic implemental approaches as follow.

DESCRIPTION OF THE PREFERRED EMBODIMENT

Figure 1:
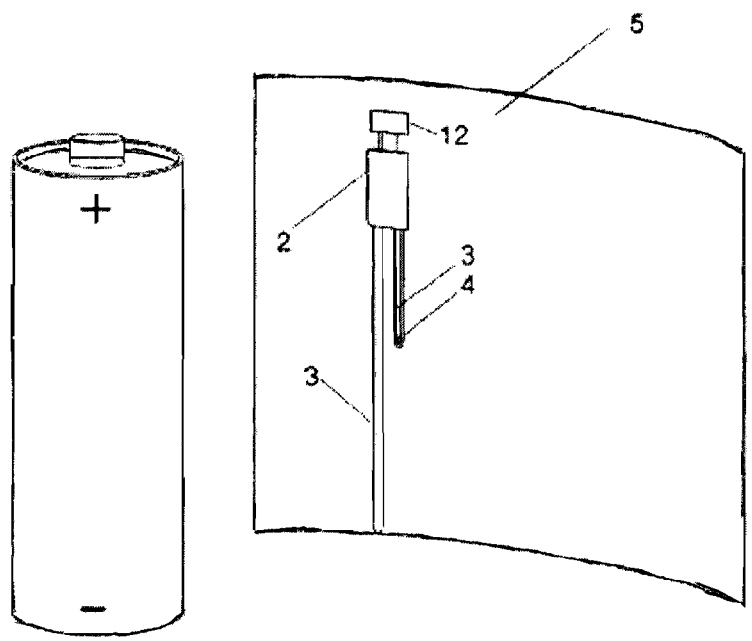
FIG. 1 is sketch map of this invention's implemental example 1.

Implemental example 1: see also FIG. 1

This invention sets up a thin-film light-emitting diode 12 on an outer surface of a battery, the thin-film light-emitting diode 12 links with the battery's positive and negative poles through a conductor 3, the light-emitting diode is powered by the battery; there is an elastic membrane switch set in the power supply circuit of the light-emitting diode. The elastic membrane switch is consisted of a lead 3 and an insulator 4 that has small holes. It is normally off. The lead 3 links with the battery's negative pole through the small holes when giving outside force, and the light-emitting diode will illuminate; the light-emitting diode is disposed between the packaging wrap 5 and the main battery body.

Figure 2:
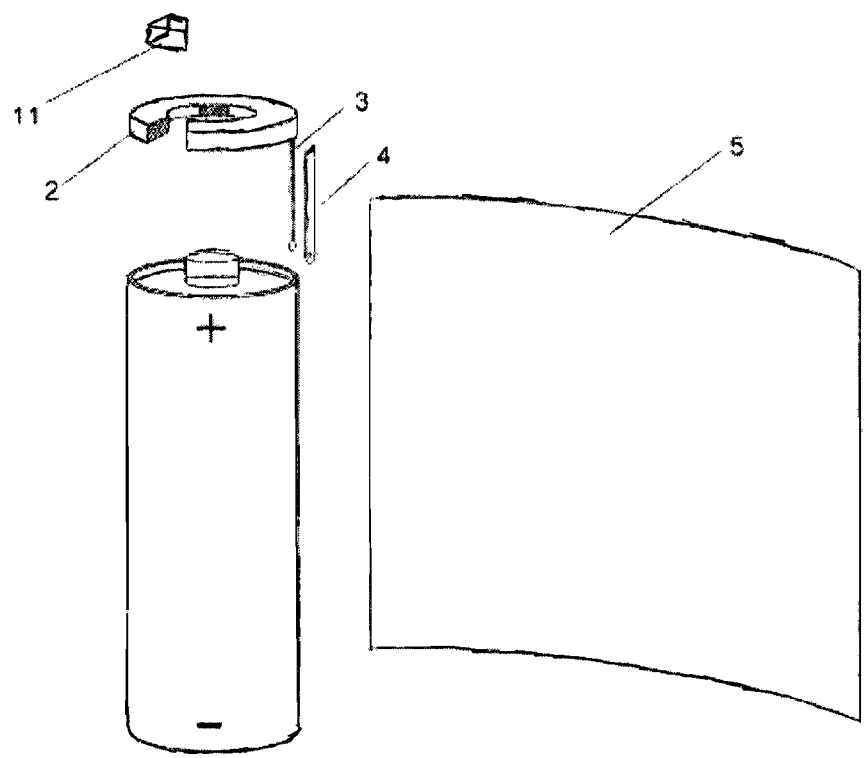
FIG. 2 is sketch map of this invention's implemental example 2.

Implemental example 2: see also FIG. 2

Light-emitting diode is fixed on a top or bottom end of a battery. The top end of the battery is a positive pole, the bottom end of the battery is a negative pole, so the light direction of light-emitting diode generally tracks the longitudinal axis of the battery for convenience.

With reference to FIGS. 1 and 2, the self-illuminating battery may include a driving circuit 2, a conductor 3, a membrane switch insulator 4, a packaging wrap 5 and a micro light emitting diode 11 or a thin-film light emitting diode 12.

Considering some light-emitting diode's illuminating voltage are higher than 1.5V, however, the common family battery, namely, D, C, AA, AAA, their voltages are around 1.5V. To be an improvement, a driving circuit is set at a top of the battery, and linking with the light-emitting diode, using to complete voltage conversion between the common family batteries' 1.5V and the light-emitting diode's voltage.

What is claimed is:

1. A power supplying battery with a light emitting diode, comprising:
    a battery main body including a positive pole and a negative pole; and
    at least one thin-film light-emitting diode including a first end and a second end, with the first end being electrically connected to the positive pole and the second end being electrically connected to the negative pole, wherein the thin-film light-emitting diode is located between a packaging wrap of the battery main body and the battery main body.

2. The power supplying battery as claimed in claim 1, wherein said thin-film light-emitting diode is located at an outer surface of the battery main body, covered by the packaging wrap a portion of the packaging wrap covering the thin-film light-emitting diode is transparent.

3. The power supplying battery as claimed in claim 1, further comprising a driving circuit for driving the thin-film light-emitting diode, the driving circuit being disposed under a packaging wrap of the battery main body.

4. The power supplying battery as claimed in claim 1, further including a switch connecting the positive pole and the negative pole of the battery.

5. The power supplying battery as claimed in claim 4, wherein said switch is a membrane contact switch.

6. The power supplying battery as claimed in claim 4, wherein said switch remains in an off position when the light-emitting diode is not used for illumination.

7. The power supplying battery as claimed in claim 1, wherein said battery main body is one selected from the group consisting of D, C, AA and AAA sizes.

8. The power supplying battery as claimed in claim 1, wherein the power supplying battery has a same size and a same volume of power as one selected from the group consisting of D, C, AA and AAA batteries.

9. The power supplying battery as claimed in claim 1, wherein said battery main body is one selected from the group consisting of 3V, 6V and 9V voltages.

\* \* \* \* \*